(12) United States Patent
Rausch

(10) Patent No.: US 7,676,478 B2
(45) Date of Patent: Mar. 9, 2010

(54) DATA WAREHOUSING SYSTEMS AND METHODS HAVING REUSABLE USER TRANSFORMS

(75) Inventor: Nancy A. Rausch, Apex, NC (US)

(73) Assignee: SAS Institute Inc., Cary, NC (US)

( * ) Notice: Subject to any disclaimer, the term of this patent is extended or adjusted under 35 U.S.C. 154(b) by 399 days.

(21) Appl. No.: 11/497,782

(22) Filed: Aug. 2, 2006

(65) Prior Publication Data

US 2007/0174308 A1      Jul. 26, 2007

Related U.S. Application Data

(60) Provisional application No. 60/757,690, filed on Jan. 10, 2006.

(51) Int. Cl.
*G06F 7/00* (2006.01)
*G06F 17/00* (2006.01)

(52) U.S. Cl. .................. 707/100; 707/200
(58) Field of Classification Search ......... 717/136, 717/106, 148; 707/203, 101, 202, 106, 102, 707/103 R, 100, 6, 200; 719/315; 709/217, 709/201, 315

See application file for complete search history.

(56) References Cited

U.S. PATENT DOCUMENTS

| 6,339,775 | B1* | 1/2002 | Zamanian et al. ............ 707/101 |
| 6,801,910 | B1* | 10/2004 | Bedell et al. ................. 707/6 |
| 7,024,431 | B1* | 4/2006 | Kornelson et al. ............ 707/202 |
| 7,299,216 | B1* | 11/2007 | Liang et al. .................. 707/1 |
| 2001/0034771 | A1* | 10/2001 | Hutsch et al. ................ 709/217 |
| 2001/0056460 | A1* | 12/2001 | Sahota et al. ................ 709/201 |
| 2002/0010700 | A1* | 1/2002 | Wotring et al. .............. 707/100 |
| 2002/0013862 | A1* | 1/2002 | Orchard et al. .............. 709/315 |
| 2003/0177481 | A1* | 9/2003 | Amaru et al. ................ 717/148 |
| 2004/0193893 | A1* | 9/2004 | Braithwaite et al. ......... 713/186 |
| 2004/0210607 | A1* | 10/2004 | Manchanda et al. ......... 707/203 |
| 2004/0243931 | A1* | 12/2004 | Stevens et al. .............. 715/513 |
| 2005/0210052 | A1* | 9/2005 | Aldridge ..................... 707/101 |
| 2005/0235271 | A1* | 10/2005 | Sanyal et al. ................ 717/136 |
| 2005/0256892 | A1* | 11/2005 | Harken ........................ 707/101 |
| 2006/0106856 | A1* | 5/2006 | Bermender et al. .......... 707/102 |

(Continued)

OTHER PUBLICATIONS

Alkis Simitsis (NPL: "Mapping Conceptual to Logical Models for ETL Processes"; Nov. 4-5, 2005; ACM; Bremen, Germany).*

(Continued)

*Primary Examiner*—John E Breene
*Assistant Examiner*—Giovanna Colan
(74) *Attorney, Agent, or Firm*—Jones Day

(57) ABSTRACT

Data warehousing systems and methods are described herein. In one example methodology, a plurality of transformation templates are stored in a transformation library, each transformation template including software objects that describe how to transform extracted data prior to loading the data into the data warehouse. A unique identifier may be associated with each of the plurality of transformation templates. Using this unique identifier, an instance of at least one of the plurality of transformation templates may be instantiated into a data transformation process by mapping the software objects of the transformation template into the instance of the transform using code segments. The code segments of the data transformation process are then executed to transform and load the extracted data into the data warehouse.

15 Claims, 13 Drawing Sheets

U.S. PATENT DOCUMENTS

2006/0112123 A1* 5/2006 Clark et al. .................. 707/101
2007/0011175 A1* 1/2007 Langseth et al. ............ 707/100
2007/0083850 A1* 4/2007 Kapoor et al. .............. 717/106
2008/0140705 A1* 6/2008 Luo ........................ 707/103 R
2009/0037514 A1* 2/2009 Lankford et al. ............ 709/201

OTHER PUBLICATIONS

"Modeling and Optimization of Extraction-Transformation-Loading (ETL) Process in Data Warehouse Environments"; Alki Simitsis; Athens, Oct. 2004.*

* cited by examiner ns and methods for performing data warehousing operations.
More specifically, systems and methods are described that
utilize one or more reusable user transformations for transforming data prior to storage into a data warehouse or other
data storage facility.

DATA WAREHOUSING SYSTEMS AND METHODS HAVING REUSABLE USER TRANSFORMS

CROSS-REFERENCE TO RELATED APPLICATIONS

This application claims priority to U.S. Provisional Application Ser. No. 60/757,690, filed on Jan. 10, 2006. The entirety of this prior patent application is hereby incorporated by reference into this application.

TECHNICAL FIELD

This application describes software-implemented systems and methods for performing data warehousing operations. More specifically, systems and methods are described that utilize one or more reusable user transformations for transforming data prior to storage into a data warehouse or other data storage facility.

BACKGROUND

Data warehousing systems are well known in this field of technology. FIG. 1, for example, describes a typical data warehousing methodology known as ETL, which acronym stands for Extract, Transform and Load. In a typical ETL process 10, source data 12 is first extracted 14 by an extraction process. Following the data extraction process 14, the source data is then transformed from its native format as defined by a source data structure into a common format as defined by the data warehouse 20. Although only one data source 12 is shown in FIG. 1, in a typical implementation many data sources, each with distinct native formats, are extracted and transformed into the common format of the data warehouse 20. In this way, disparate data sources and structures can be maintained using the common format of the data warehouse. In these typical multi-source implementations, each distinct native format will require a separate transformation process 16 in order to map the source data into the common format maintained at the data warehouse 20. After the data has been transformed 16, it is then loaded 18 into the data warehouse 20 for long term storage and/or for other data processing operations.

SUMMARY

Data warehousing systems and methods are described herein. In one example methodology, a plurality of transformation templates are stored in a transformation library, each transformation template including software objects that describe how to transform extracted data prior to loading the data into the data warehouse. A unique identifier may be associated with each of the plurality of transformation templates. Using this unique identifier, an instance of at least one of the plurality of transformation templates may be instantiated into a data transformation process by mapping the software objects of the transformation template into the instance of the transform using code segments. The code segments of the data transformation process are then executed to transform and load the extracted data into the data warehouse.

DETAILED DESCRIPTION

Figure 1:
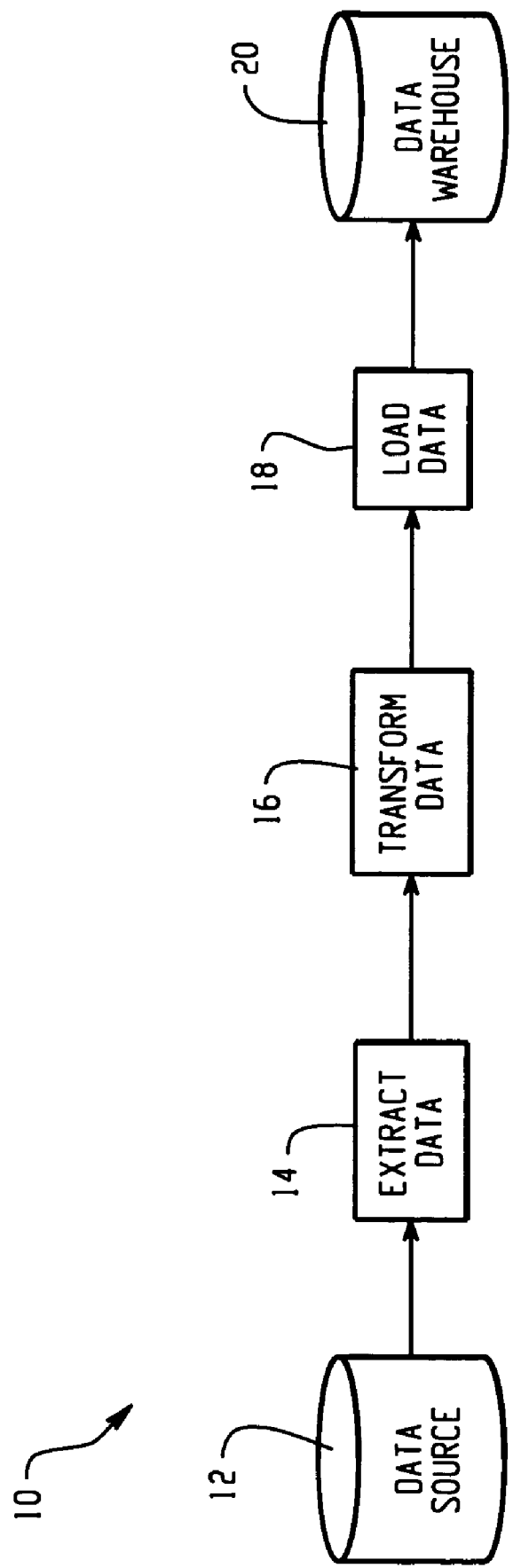
FIG. 1 is an example data warehousing process employing the ETL methodology.
Figure 2:
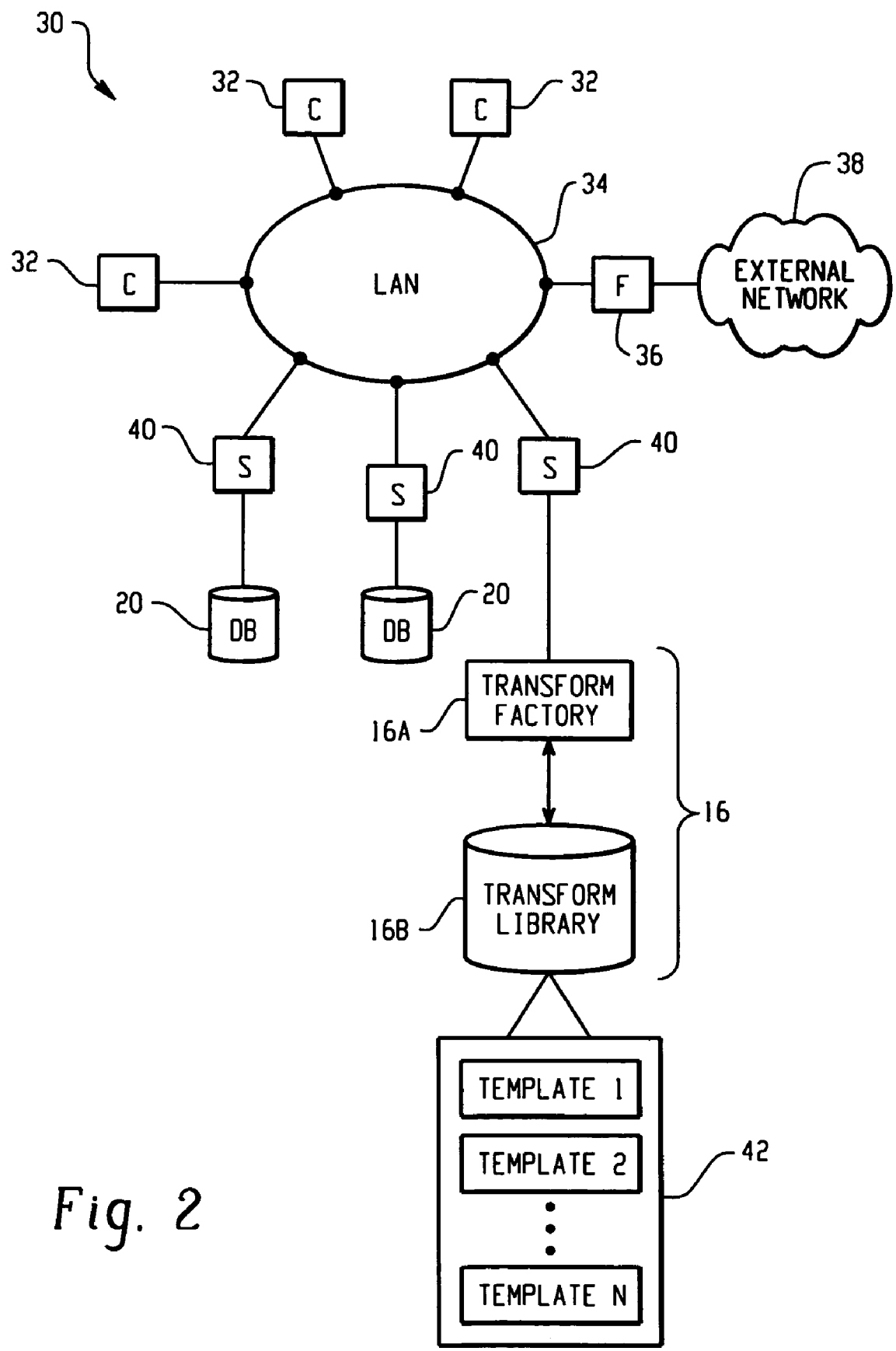
FIG. 2 is an example network topology showing components of a data warehousing system employing a library of reusable user transformations.

Turning now to the remaining drawing figures, FIG. 2 is an example network topology 30 showing components of a data warehousing system employing a library 16B of reusable user transformations. This example network topology 30 is similar to that which would be found in a corporation, in which a local area network 34 is coupled to numerous client workstations 32, various file, application and database servers 40, and may also be coupled to one or more external networks 38 through a secure gateway server 36. Also shown in this example is a system for designing, maintaining, and using reusable user transforms comprising a transform factory application 16A operating on a server 40, and a transform library 16B for storing a plurality of user defined template transforms 42. As described more fully herein, these template transforms 42 are user-defined templates that are instantiated into various user job processes by the transform factory 16A in order to transform data from a native source format into a common format for storage into a data warehouse or other type of data storage facility.

The systems and methods described herein provide a methodology for creating a library 16B of user written transformations that can be shared and persisted on multiple servers 40. The methodology provides users with the ability to enrich a library of transformations 16B with custom designed transformations that meet the business needs of each user. These custom designed transformations are stored as templates in the library 16B, which can subsequently be persisted both internally to a server and/or externally to a file using, for example, an XML code structure or some other type of code structure.

The methodology may also include a transform factory 16A that creates instances of the stored template transforms and links the instances back to the original template stored in the library 16B. Because all instances of a particular transform are linked back to the original transformation template, changes made to the original may be propagated to all of the instances. Thus, if certain business rules change or if the user interface of the transform requires alteration, then the designer of the template simply changes the transformation template object stored at the library 16B, and all uses of that transform object receive the updates. The linkage between the template transforms 42 and the instances thereof in various data warehousing job processes also provides for impact analysis, so that the impact of a change can be easily determined prior to propagating such change to the various processes that use the template.

The transform factory 16A provides the ability to create individual templated transforms 42 and to store these in a master library 16B of available transforms that can be used to create instances of transformations in any job process. The factory 16A serves as the mechanism that is used to describe the templated transformation, for example using meta data. The factory 16A creates all of the information necessary to reconstruct the templated transformation, and/or to create an instance of the templated transformation in any job process.

Metadata associated with a templated transformation 42 is preferably used to describe what is needed to construct the transform. The metadata may include: (i) general information including a name and description of the transform; (ii) a code body and options objects, which are used as substitutions for variables that can be configured at instance time to personalize the behavior of the transform when it is instanced in a job process; (iii) a methodology whereby the designer of the transform can specify the number of inputs and outputs that the transform must or can have, and put a name on each value so that it can be used in the code body as a named item; and (iv) a methodology for defining options to personalize the transform.

Figure 3:
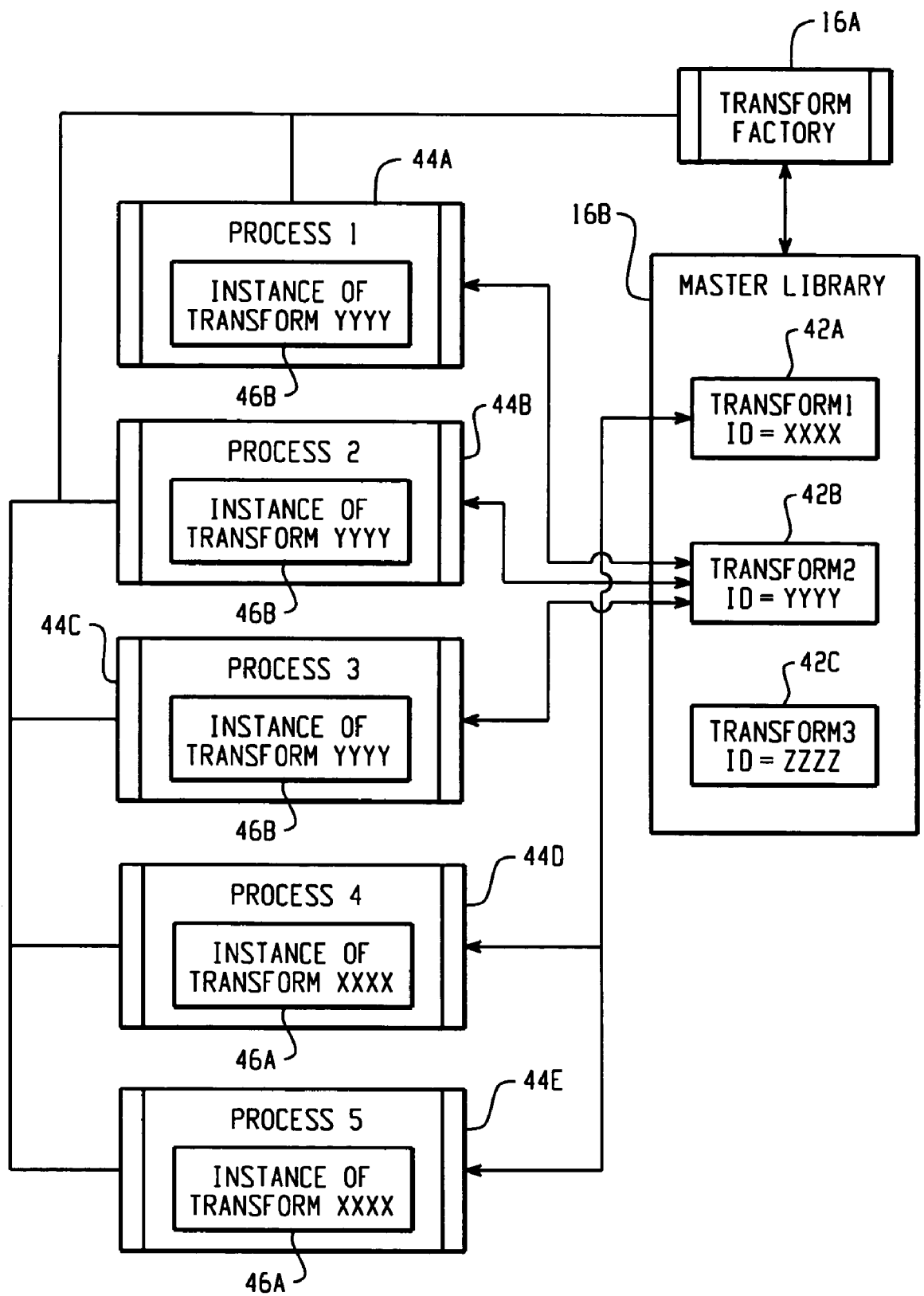
FIG. 3 is an example block diagram of a data warehousing system in which a plurality of user defined processes are linked into a plurality of template transformations maintained in a library of reusable user transformations.

FIG. 3 is an example block diagram of a data warehousing system in which a plurality of user defined processes 44A-44E are linked into a plurality of template transformations 42A-42C maintained in a library of reusable user transformations 16B. Also shown in FIG. 3 is the transformation factory 16A, which is a software application used to manage and maintain the transformations 42A-42C, and which is also used to control the instantiation of the template objects into the user processes 44A-44E. In doing so, the factory 16A maintains a pointer, link, control variable, or other type of identification code to the library of available templates 42A-42C that can be instantiated into any process.

When a transform is instantiated into a process, the factory 16A reads the template 42A-42C from the library 16B that describes the transformation, and creates an instance of that object in a job process. The pointer, link, etc., typically remains between the template transform in the process library and the instantiated transform in a process. FIG. 3 shows three job processes 44A, 44B, 44C linked to the template transform identified by the value ID=YYYY and two job processes 44D, 44E linked to the template transform identified by the value ID=XXXX. By storing this link between the template and the job processes, changes to the transform can be readily propagated through to all instances of that transform in the linked job processes. In addition, prior to propagating such changes, a user of the system can optionally perform impact analysis on the changes to the template in order to determine the impact of the changes on the various job processes that are linked to the modified template.

Figure 4:
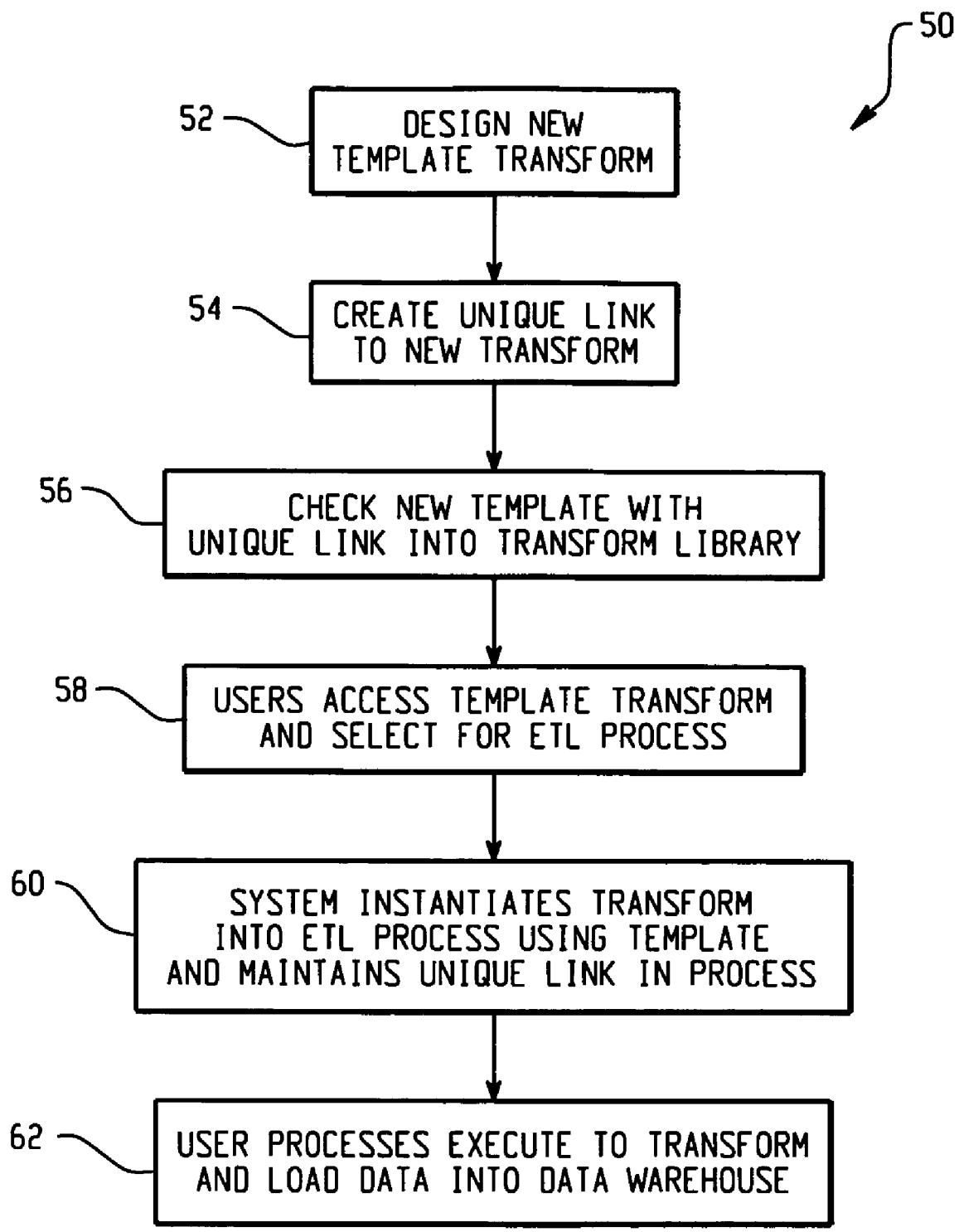
FIG. 4 is an example methodology for designing a template transformation and using the template to process and load data into a data warehouse.

FIG. 4 is an example methodology 50 for designing a template transformation and for using the template to process and load data into a data warehouse. In step 52, a user of the data warehousing system interfaces with a design application, such as may be provided by the transform factory application 16A, in order to design a new template transformation. Further details of an example design process are detailed below. After the new template transformation has been designed, a unique link is created in step 54, preferably by the system 16A, and this unique link is associated with the newly-designed template. The unique link is preferably generated in a manner such that it is unique to a particular data warehousing system, regardless of the size and scope of the implementation. For example, a particular system may have template transformations stored within multiple libraries 16B. These libraries may be physically located at different places. The system is able to access these different libraries 16B and is also able to maintain and control the generation of the unique links so that across the various libraries each template transformation is guaranteed to have uniqueness in this identifying link. In this manner, users can also access, use and manage selected template transformations, even though the templates are stored in different libraries.

In step 56 the newly-designed template transformation, with its unique link, are checked into the master library 16B. Following storage, users of the system may then access the template transformations in step 58 and select a stored template for use in a particular data warehousing job process. After selection, the system then instantiates the transformation into the users job process in step 60. This instantiation process may, for example, take the form of converting metadata objects stored with the designed template in the master library 16B into executable code segments associated with the job process. These executable code segments could be, for example, XML code segments, although they could also be formed using other types of programming code segments. In addition to this conversion process, the system also maintains the unique link in the instantiated job process so that the job process is connected back to the template library 16B. Following instantiation, the user job process is then executed in step 62 to transform and subsequently load data from its source location into the data warehouse.

Figure 5:
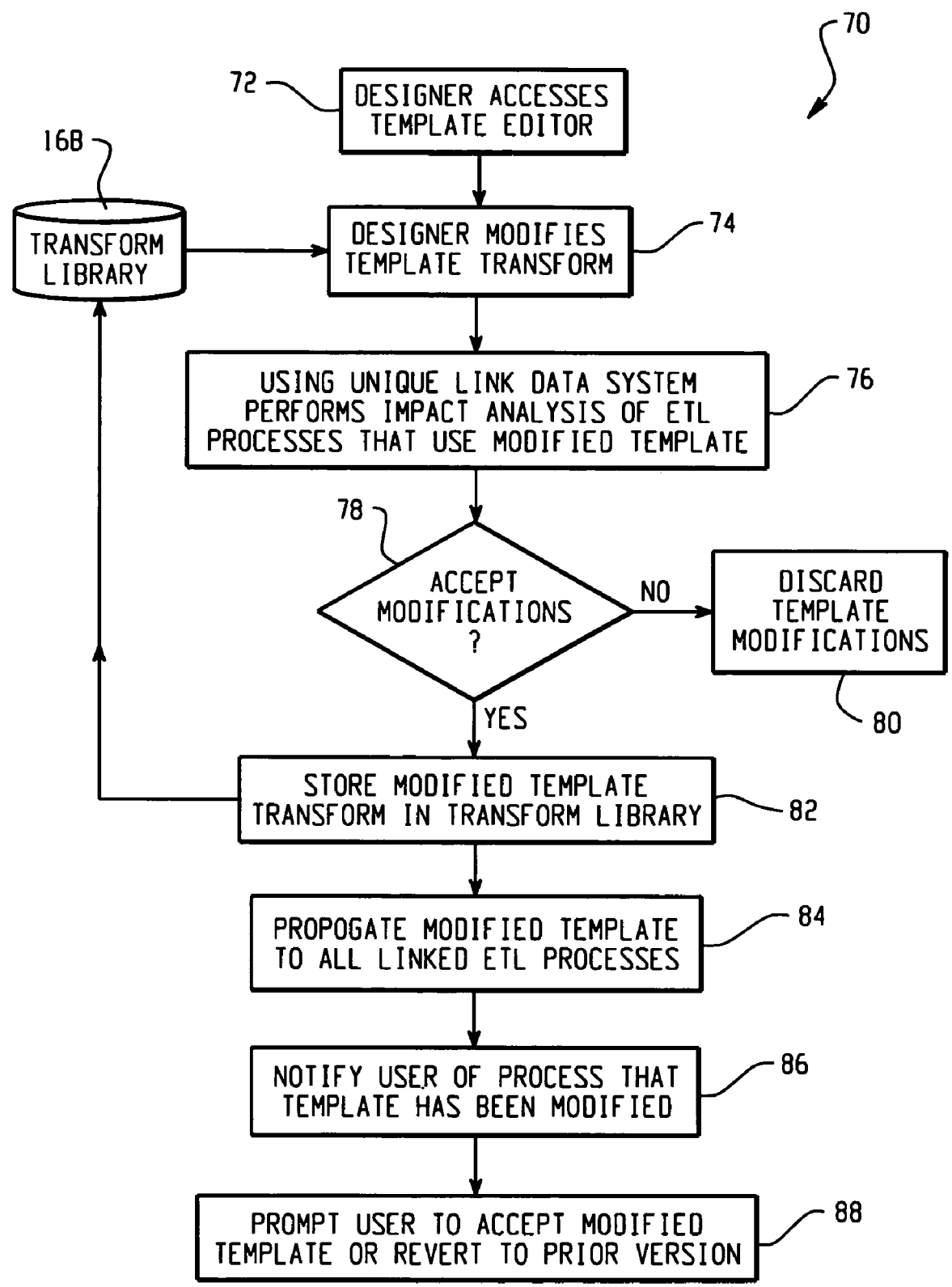
FIG. 5 is an example methodology for modifying a template transformation and for propagating such modifications to user defined processes linked to the modified template.
Figure 10:
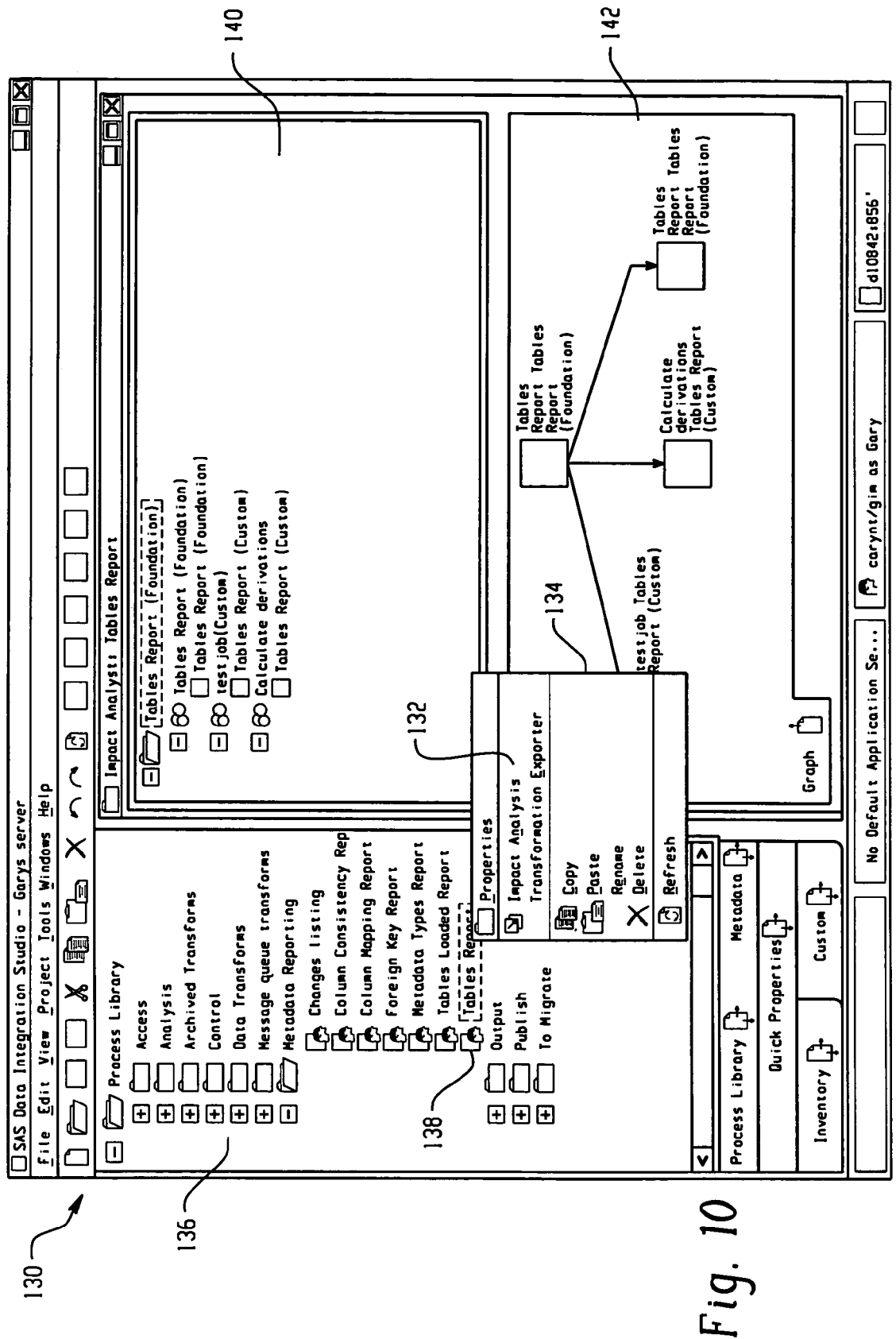
FIG. 10 is an example graphical user interface for visualizing impact analysis in a data warehousing system.

FIG. 5 is an example methodology 70 for modifying a template transformation and for propagating such modifications to user defined processes linked to the modified template. The process begins in step 72, when a designer accesses a template editor application, which may be integrated into the transformation factory 16A, in order to modify an existing template transformation stored in the system. In step 74, the transform is selected from the library 16B, and the designer modifies the template transform using the template editor application. Following modification, the designer is then able to perform an impact analysis on the modified template at step 76. Impact analysis is a function that uses the unique link data associated with the template transform to graphically depict for the user how the modified template may change the operation of the job processes that are linked to that template. FIG. 10, below, depicts an interface screen that is used to visualize this impact analysis function.

After the impact analysis is completed, the designer is then prompted at step 78 as to whether they want to accept the modifications to the template. If the designer determines that the modifications should not be saved to the template, then the modifications are discarded at step 80, and the original template transform is re-saved to the library 16B. If, however, the modifications are accepted in step 78, then in step 82 the modified template is stored to the template library 16B in place of the original template. Subsequently, in step 84, the modified template is propagated to each of the job processes that are linked to the modified template via the unique link structure. Optionally, in step 86, the designer of the data warehousing job processes that are linked to the modified template are notified that the template has been modified by the designer. The users are then prompted in step 88 to accept or deny the modified template. If a user accepts the modified template then the prior, original template is replaced with an instantiated version of the modified template now stored at the template library 16B. The unique link is maintained from the job process to the modified template. If, however, the user does not accept the modified template, then the prior, original version of the template is maintained as part of the job process. In this manner, users can either upgrade their job processes to use the latest version of a particular template transformation, or they can continue to use a prior version of the template that was previously instantiated into their job processes.

Figure 6:
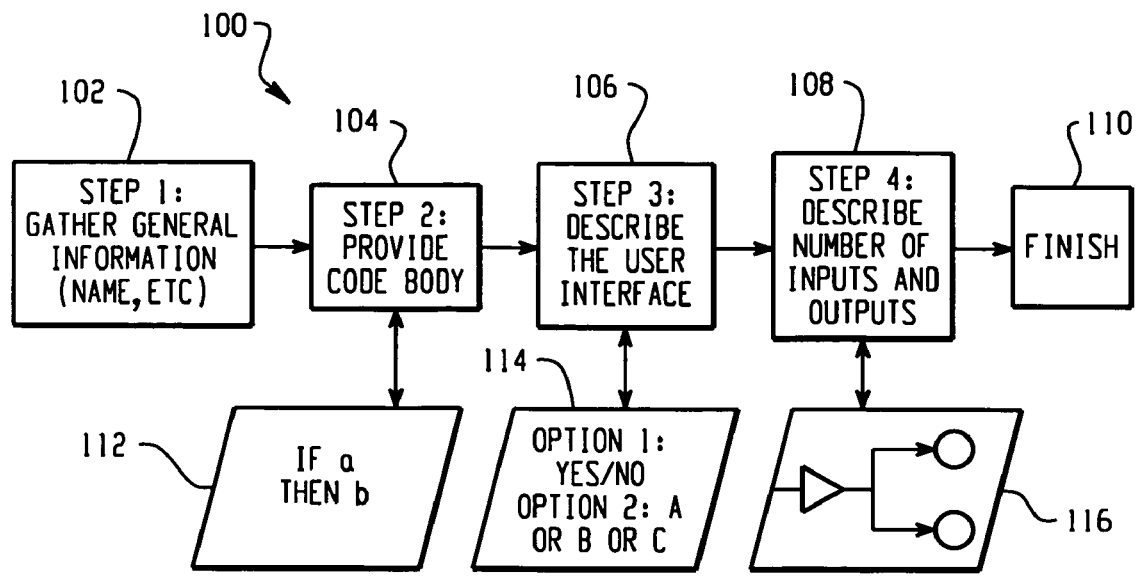
FIG. 6 is an example flow diagram for building a new template transform.

FIG. 6 is an example flow diagram 100 for building a new template transform. In the first step 102, the designer inputs general information that describes the new template transform that they want to build. This information may include a name and a description of the template, for example, which may be visible to consumers/users of the transform display interface when the transform is instantiated into a data warehousing job process. In the second step 104, the designer provides the necessary code body (i.e., logic 112) that is executed when the transform is instanced into a specific job process. In the third step 106, the designer describes the interface to be presented by the transform when the transformation is instanced into a job process. This interface allows the instanced version of the transformation to be customized in a particular job process by providing a number of option variables 114 for selection by the user. In addition to providing these option variables, the designer may select a default value for the option. Finally, in the fourth step, the designer describes the number of inputs and outputs 116 that may be necessary to complete the transform when it is instanced into the job process. The template build process ends at step 110, at which point the template is saved to the library 16B for subsequent instantiation and use in various data warehousing job processes.

Figure 7:
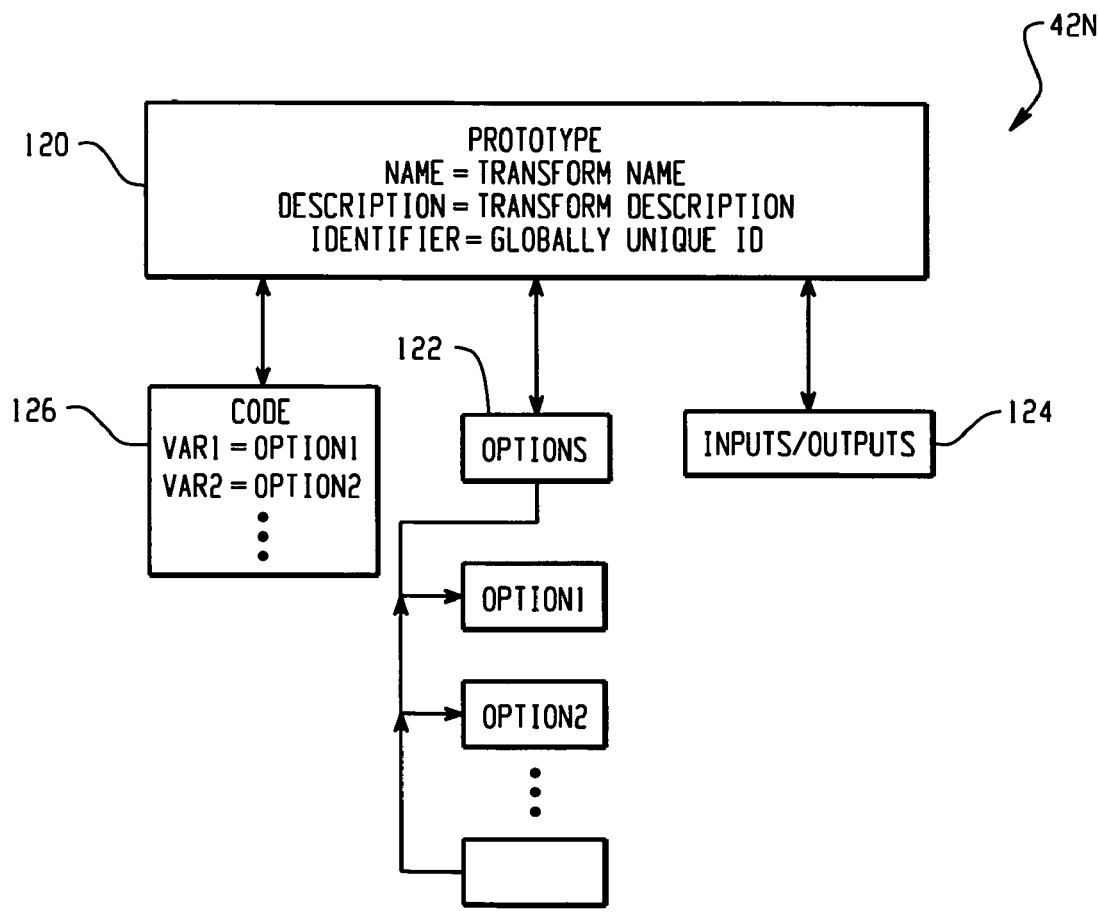
FIG. 7 is an example metadata model representation of a template transformation.

FIG. 7 is an example metadata model representation 42N of a template transformation. The metadata includes information that describes the templated transform 120, including its name, description, and a globally unique identifier that is used to link the template to various data warehousing job processes. (Metadata object 120 is also referred to herein as the Prototype object.) The metadata objects shown in FIG. 7 also include all options 122, interfaces 124, and code 126 necessary to describe the structure of the transform. This metadata is used by the factory 16A when it is requested to instantiate a transform into a particular job process. The metadata is used by the factory 16A to reconstruct a transformation instance in a job process that can be executed at run time to provide the transform interface for the user, and to operate the code that transforms the input data into the appropriate output data structure for storage in the data warehouse.

Figure 8:
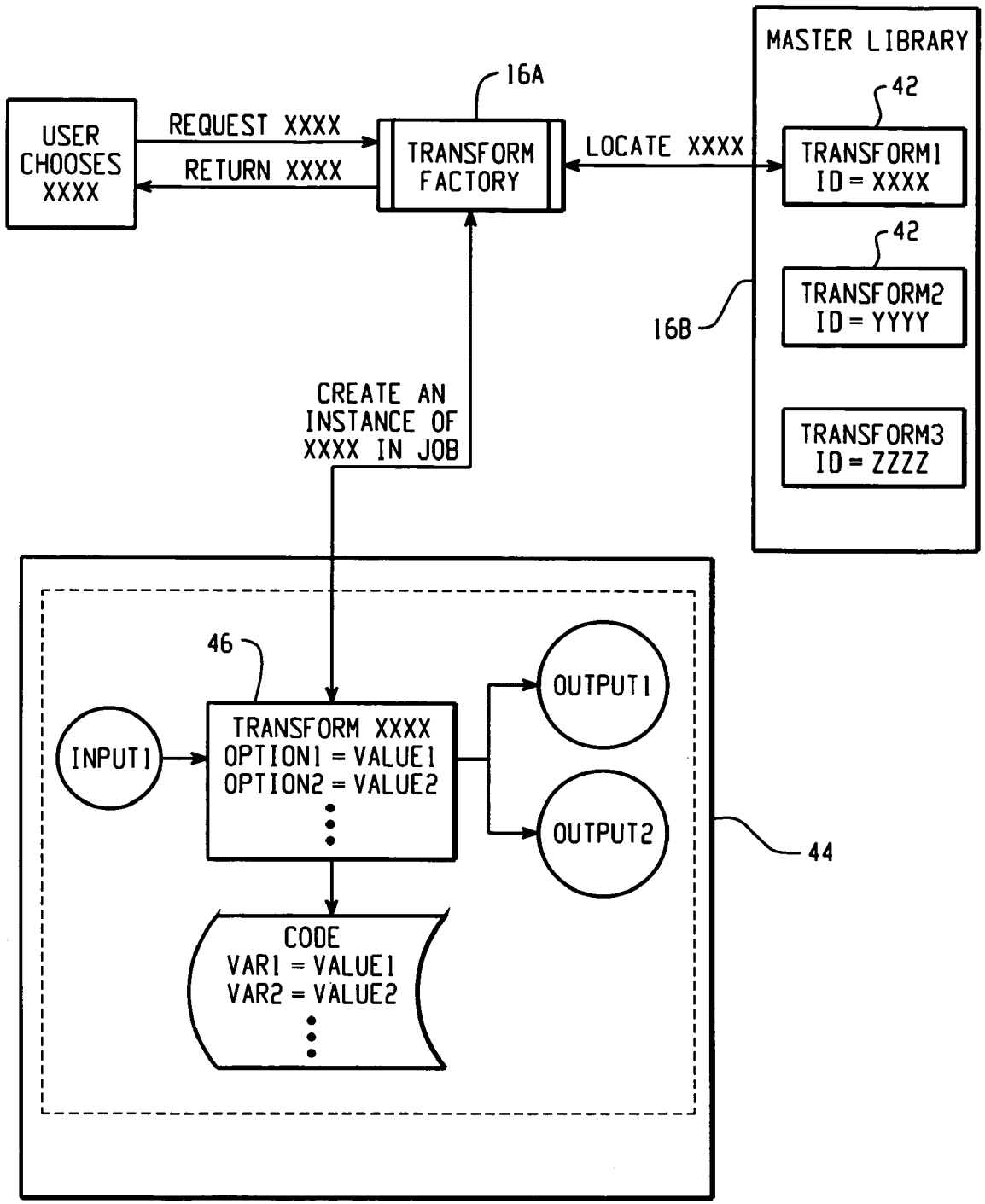
FIG. 8 is an example block diagram showing a process used by the transformation factory to construct an instance of a templated transform.

FIG. 8 is an example block diagram showing a process used by the transformation factory 16A to construct an instance of a templated transform. After the user selects a particular template, shown as template XXXX in FIG. 8, the transform factory 16A then locates the appropriate transform, and reads the metadata description of the selected transform from the master library 16B. As described above, the metadata description of a template transform describes the interface and functionality of the transformation. The transform factory 16A then constructs an instance of the transform 46 in a job process 44 using the metadata description. The instance of the job process could be, for example, a series of XML code segments. Other forms of executable code segments could also be generated by the transformation factory 16A when creating an instance of a template transformation.

Figure 9:
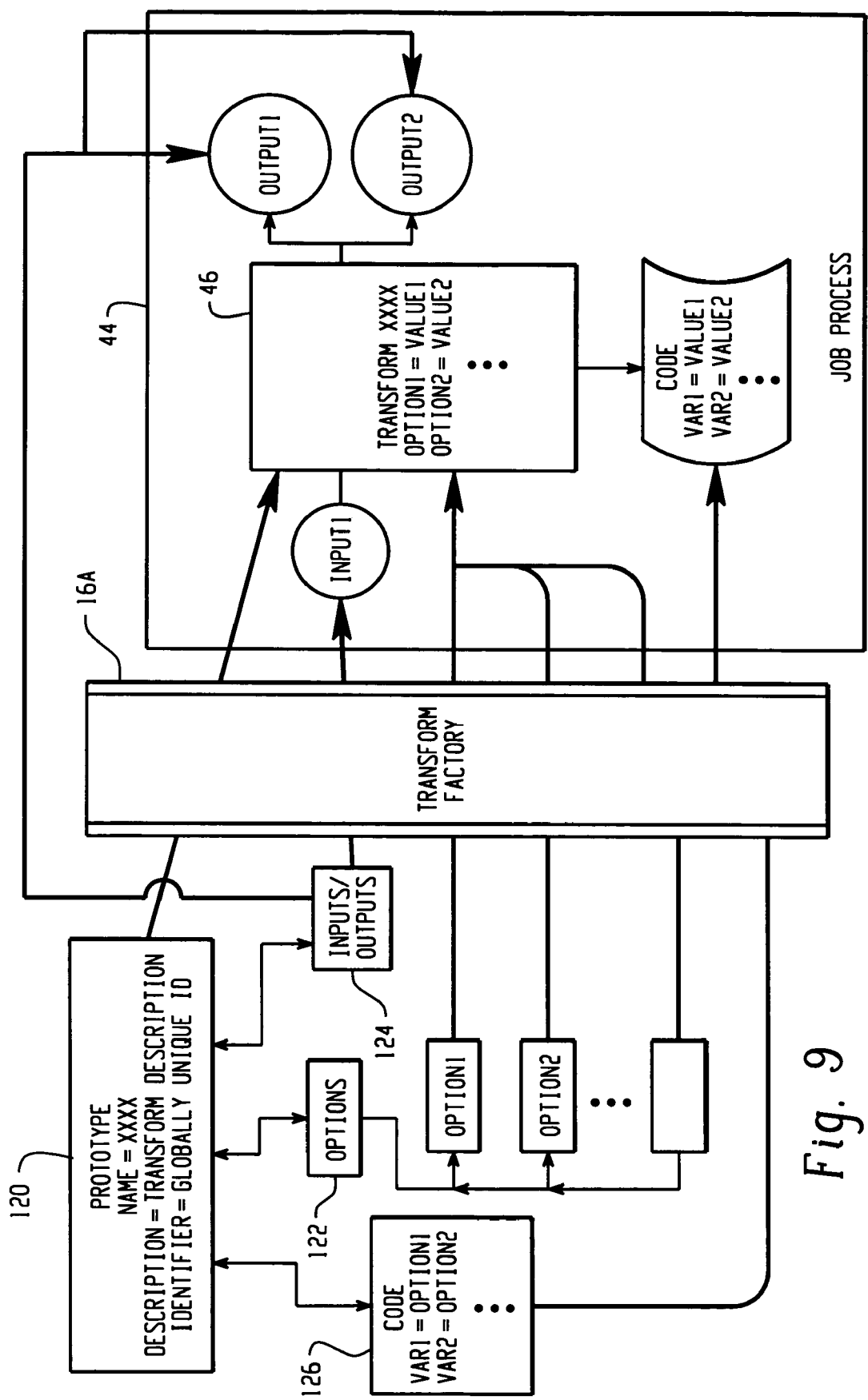
FIG. 9 is an example block diagram explaining how the metadata contained in the template transforms maps to software items used by the transformation factory to construct an instance of a templated transform in a job process.

FIG. 9 is an example block diagram explaining how the metadata contained in the template transforms maps to software items (code segments) used by the transformation factory to construct an instance of a templated transform in a job process 44. The main Prototype object 120 supplies the name and description of the instanced transform 46. The option metadata objects 122 are translated to options that are used to personalize the transform instance in the job process. These option values are filled in by a user of the instanced transform, and are then included as the values of the variables supplied in the generated code that the instanced transform contributes to the job process. The generated code is supplied to the instanced transform via the code metadata object 126. The inputs/outputs metadata objects 124 provide the factory 16A with the name of each input/output and how many inputs and outputs are required to complete the transform when it is instanced in a job process. The transform factory 16A, when it constructs the instanced transform, then creates the transform with the appropriate number of inputs and outputs that must be filled in by a user of the transform in the data warehousing job process.

The transformation templates can be exported and shared between numerous repositories 16B. An export definition file can be generated by the system that includes all of the metadata components that describe the transformation template. This exported definition file may be stored in XML in a text file, and the format of the XML may be standardized such that the XML can be parsed using any valid XML parser. The structure of the XML created by the transformation factory 16A may be uniquely defined by the factory, i.e., the factory understands the structure of the XML and can completely reconstruct a transformation template based upon the XML when the XML is imported into the target location. Because each transformation template includes the globally unique identifier, any master library 16B on any server is guaranteed to have only unique transformations registered.

FIG. 10 is an example graphical user interface 130 for visualizing impact analysis in a data warehousing system. This interface may be provided as part of the transformation factory 16A, or it may be provided as part of a separate analytical application. Using this interface, the user selects the Impact Analysis menu item 132 from the displayed pop-up window 134 for any generated transformation in the process library tree 136 displayed on the left hand portion of the interface. Here, the user has selected to perform impact analysis on the transformation called "Tables Report" 138. The windows 140, 142 on the right hand portion of the interface are then displayed, which show the link between the library master template object, and each of the job instances that use that object. The impact view shown in these two windows is available in two different forms. The top form 140 shows the report view. In the report view 140, the top of the tree is the master template object in the master library. This is the template transform object that is contained in the master library. The second level of the tree lists each data warehousing job process that contains (and is linked to) that template object by name, and the metadata repository on the server where that template object resides. The lowest level node of each tree (the leaf nodes) show the individual instances of the master (or Foundation) template transform that resides in different jobs. If a user has customized the master (Foundation) template, then the impact analysis view indicates this by placing the parenthetical "(Custom)" next to the display of the template being used. The second view 142 is a graphical view of the same information showing the master template object and each instance in the user job processes.

The following description provides an example of generating the transformation templates using the Extensible Markup Language (XML). This is only an example of how the templates can be instantiated into job processes—other methodologies, languages, or techniques could also be utilized depending upon the implementation of the technology.

A transformation template may be fully describable using an XML syntax structure, for example. The transformation factory 16A is programmed to understand the structure of the XML and it may use the XML in at least three ways. The first way is to construct metadata in a metadata repository that describes the transformation template from the XML when the transformation template XML is imported in the target repository. The second way is to recreate the XML from metadata objects when a transformation template is selected to be exported into XML for persistence and sharing. And the third way is to construct new instances of a generated transformation when the transformation is used in a job process.

The XML structure describes the transformation template, including all options, the code that underlies the transformation template which is run when the transformation template is used in a job process, all of the inputs and outputs, and the globally unique number/identifier that names the transformation template. The XML is preferably structured such that it can be parsed using any valid XML parser.

The XML directly maps to metadata objects vis-à-vis the transformation factory 16A. The factory parses incoming XML and converts it into metadata objects to persist it so that it is usable in the master process library 16B. The transformation factory 16A can also read the metadata objects stored in the process library 16B and convert them back into XML when a user chooses to export the transformation templates to a file. An example XML transform is now described.

The first part of the XML is the metadata object used by the transformation factory 16A as the top level object, defined as follows in XML:

<Object Type="Prototype">

Next is the master object id number that is used to uniquely name the template object and to link the template to instances in job processes:

<ExternalIdentity Identifier="d7380f9e-0a17-0c81-00ed-fb95e427de50" Desc=" "

Each object then contains a version number, defined in XML as follows:

```
<Property IsExpert="0" Desc="Last update version for
prototype" Delimiter="" IsUpdateable="0"
MetadataCreated="13Dec2005:14:19:44" IsRequired="1"
IsVisible="1" Name="VERSION" PropertyName="VERSION"
MetadataUpdated="13Dec2005:14:19:44" LockedBy=""
UseValueOnly="0" IsLinked="0" DefaultValue="1"
PropertyRole="VERSION" Id="$1">
```

This version number is used to relate the instances of the transform back to the foundation template transform. Each template object has a version attribute applied to it. Every time a transformation is instanced from that template, the instanced transformation gets a copy of the version attribute that describes which version of the template was used to build the instanced transform. When a user customizes an instance of the transform, those customizations are stored with the instanced transform, they are not propagated back to the template. If the designer of the template then decides to change the interface of the transform in the master library, or makes some other change to the template, the version number is auto incremented by the system. When a job process is subsequently launched using an instance of that transform, the job process compares its version with the master version number. Differences between the template and instanced versions can then be automatically detected by the system and either updated automatically or updated with a user prompt.

FIG. 7, discussed above, shows the metadata structure used to store a transformation template. In this structure, the prototype object 120 is used as the master template object, and it contains the name, unique ID number, version information, and other general information regarding the template. The prototype object 120 points to the code template 126, which is used to instantiate each instance of the transformation template, the input/output definitions 124, and the options 122.

Inputs/outputs 124 are modeled in XML as follows:

```
<AssociationProperty
    Name="Place table or transform here"
    PartnerName= "__INPUT0
    Minimum="2"
    Maximum="5/>
<AssociationProperty
//..next input (s) or output (s)
```

In this XML, the designer can provide a unique user prompt for the input/output template, she can specify the required minimum number of inputs/outputs that the transform must have to be considered complete, and she can specify the required maximum number of inputs/outputs that the transform must have to be considered complete. There can be as many "AssociationProperty" definitions for the inputs/outputs having different prompts as required by the design of the transformation.

In order to work efficiently with inputs and outputs inside of the code, it is important for the inputs and outputs to be able to be named by the designer. For example, if the designer wants to implement a code segment that uses input variable 1, they need to know which incoming input that the user has attached to the transformation is input variable 1. The above scheme supports this methodology using XML to describe the various input and output names that the designer has specified.

After the designer specifies the required inputs/outputs for the transform, optional inputs or outputs may be uniquely named by the designer, or they may choose to let the transformation factory 16A generate names for the optional inputs/outputs. The following code shows how additional inputs/outputs that don't require unique names but can be factory generated, are modeled in the XML:

```
<AssociationProperty
    Name="Place table or transform here"
    PartnerName= "DEFAULT"
    MetadataType="INPUT"
    AssociationName="ClassifierSources"
    Minimum="2"
    Maximum="5"
    IsVisible="1"/>
```

Once the transformation factory 16A has created the XML to model each input and/or output that the designer has specified with a unique name, it is then used to create a default template to handle the remaining inputs and outputs. This single default template handles all of the rest of the inputs and outputs that the transformation is permitted to accept. The PartnerName attribute, above, is the keyword that indicates to the transformation factory 16A that this template is the DEFAULT template. Using this default methodology reduces the size of the XML required to store the inputs/outputs information, and provides a fast way to indicate and link to inputs/outputs that require a generated name.

Figure 11:
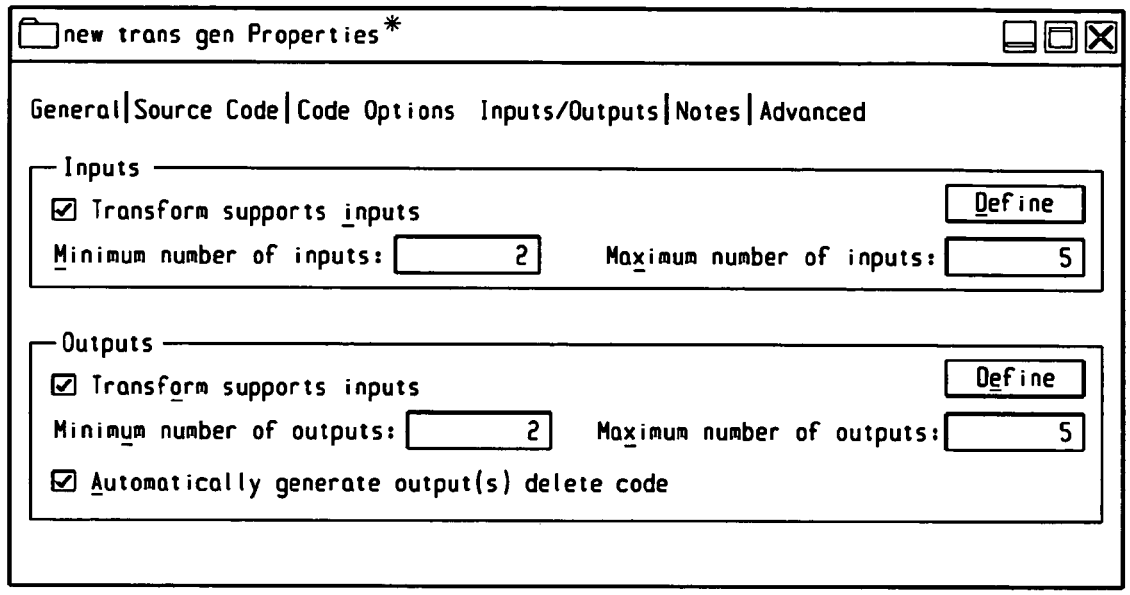
FIG. 11 is an example graphical user interface for defining the inputs/outputs of a template transform.
Figure 12:
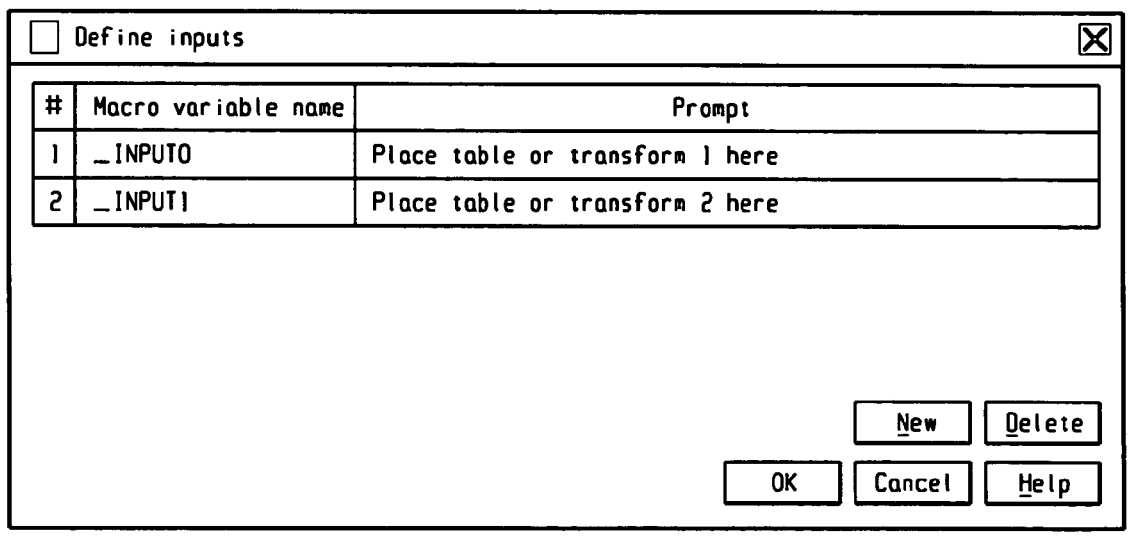
FIG. 12 is an example graphical user interface for defining prompts to be displayed corresponding to the required number of inputs for a template transform.

FIG. 11 is an example graphical user interface for defining the inputs/outputs of a template transform. This is the interface presented to a designer of the template and which is used to build the corresponding XML for the template. FIG. 12 is an example graphical user interface for defining prompts to be displayed corresponding to the required number of inputs for a template transform.

The following code shows how options can be modeled in this XML example implementation. Options are modeled via properties stored in XML on the prototype object and are instantiated into the transform when the transform is used in a job process. The options contain the configuration settings for the option such as the type, valid values, length, and other properties of the option.

```
<Property IsExpert="0" Desc="" Delimiter="" IsUpdateable="1"
MetadataCreated="21Dec2005:11:16:07" IsRequired="0"
IsVisible="1" Name="Option1" PropertyName="OPTION.Option1"
MetadataUpdated="21Dec2005:11:16:07" LockedBy=""
UseValueOnly="0" IsLinked="0" DefaultValue="this is a
default value" PropertyRole="" Id="$5">
    <PrimaryPropertyGroup />
    <SpecTargetTransformations />
    <OwningType>
    <PropertyType ObjRef="$13" />
    </OwningType>
    <ExternalIdentities />
    <StoredConfiguration>
    <TextStore ObjRef="$7" />
    </StoredConfiguration>
    <AssociatedPropertySet>
    <PropertySet ObjRef="$9" />
    </AssociatedPropertySet>
    <Properties />
</Property>
```

Each property contains the necessary information to describe what the user needs to view when the property is configured after the transformation is instantiated. Until a user overrides a property with a value other than the default value on an instance of a transform, the instanced transform obtains all of its option property settings from the transformation template stored in the master library. When the user changes a property setting to a different value from the default, the property setting is stored in a property object associated with the instanced transformation. This allows the user of the template to customize the instance of the transform as designed by the designer of the transform.

Figure 13:
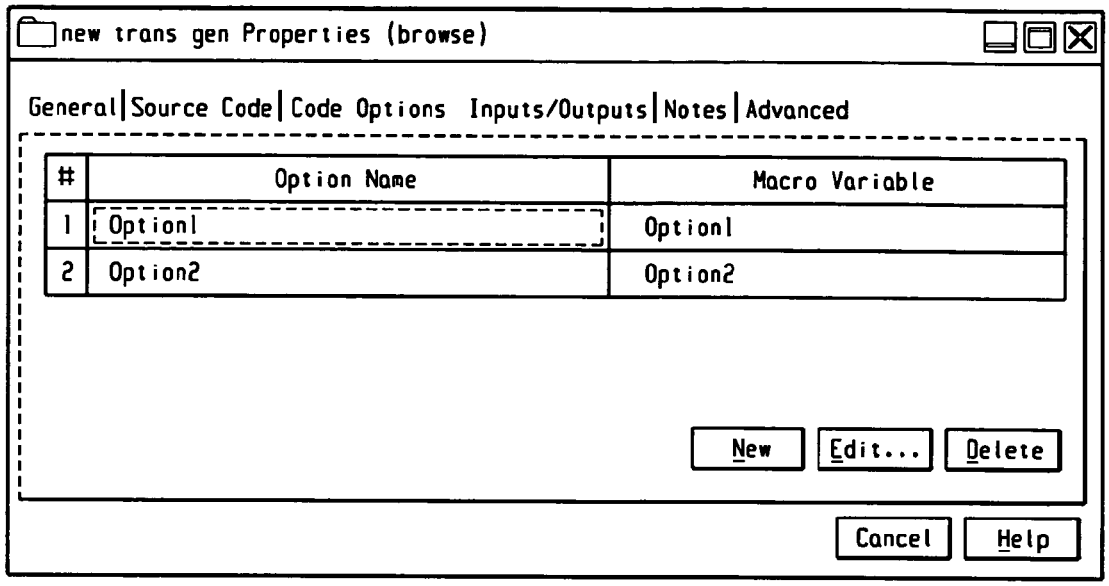
FIG. 13 is an example graphical user interface for defining options of a template transform.
Figure 14:
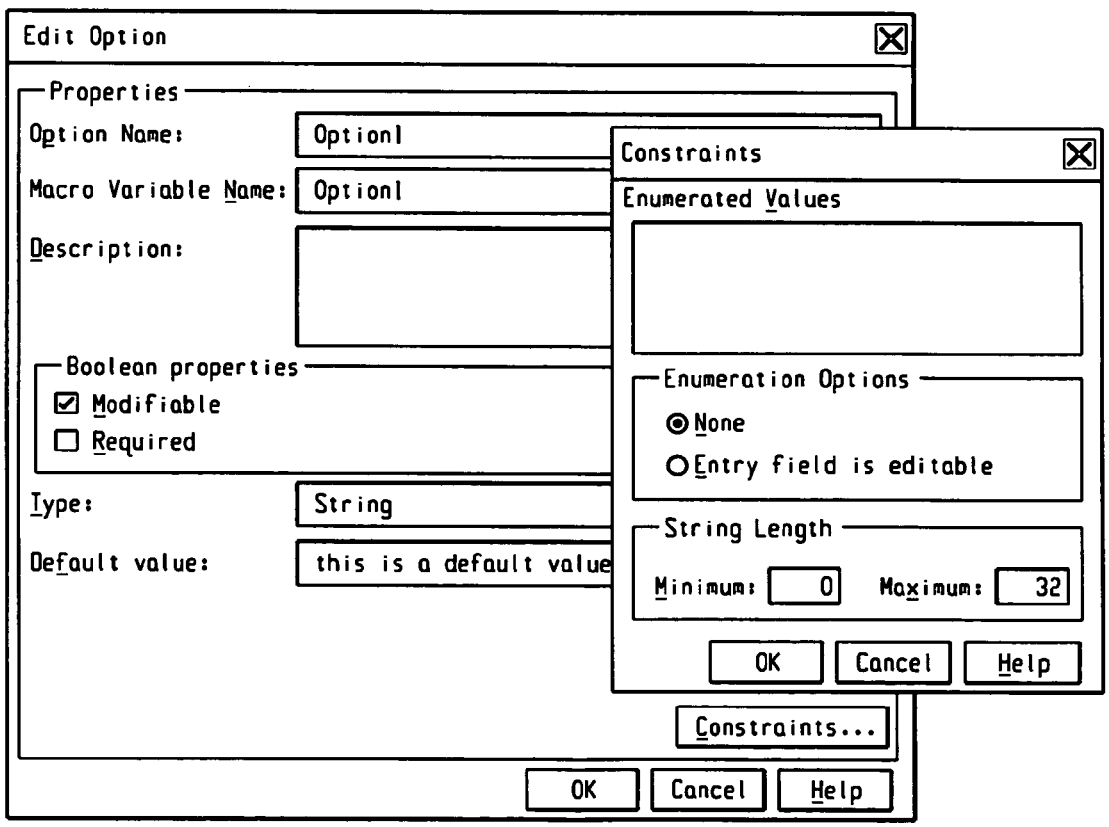
FIG. 14 is an example graphical user interface for defining details of the options selected from the interface of FIG. 13.

FIG. 13 is an example graphical user interface for defining options of a template transform. Like FIGS. 11 and 12, this interface is presented to the designer of the template for defining the template options. In FIG. 13, the designer selects the option name and macro variable. FIG. 14 is an example graphical user interface for defining details of the options selected from the interface of FIG. 13. Details of the option may include value type (i.e., numeric, character, etc.), any default value that the designer wants to provide to the user, and/or the length of the value that is permitted by the template.

Figure 15:
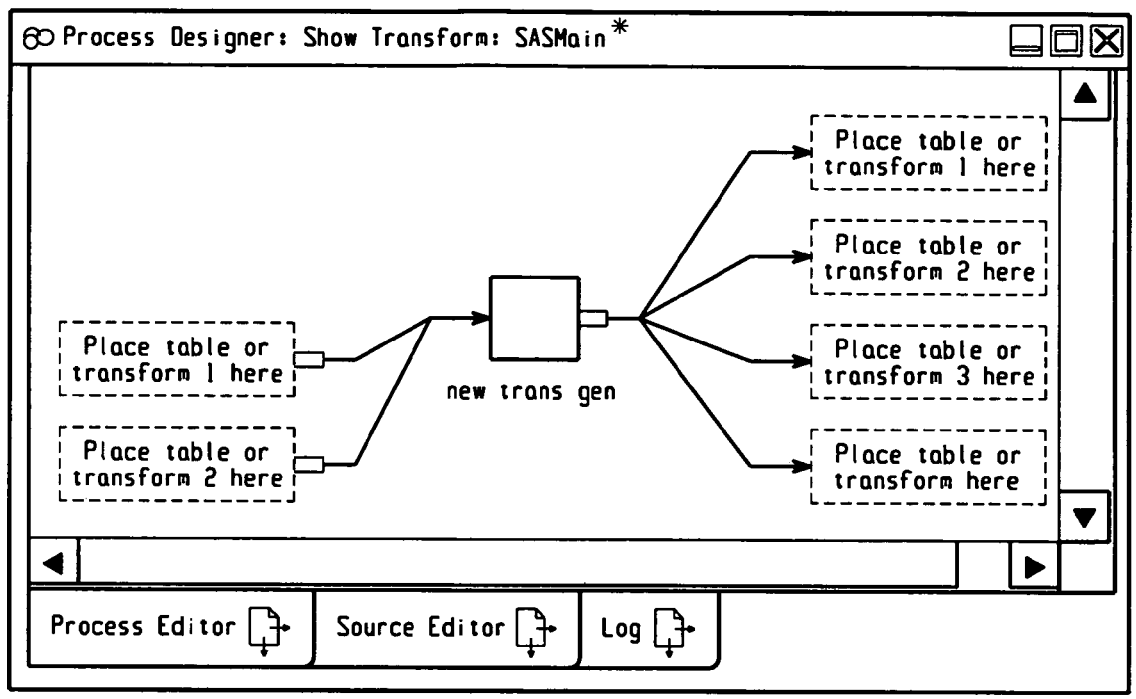
FIG. 15 is an example graphical user interface that displays how a template transform would appear to a user when integrating the template into a user defined job process.
Figure 16:
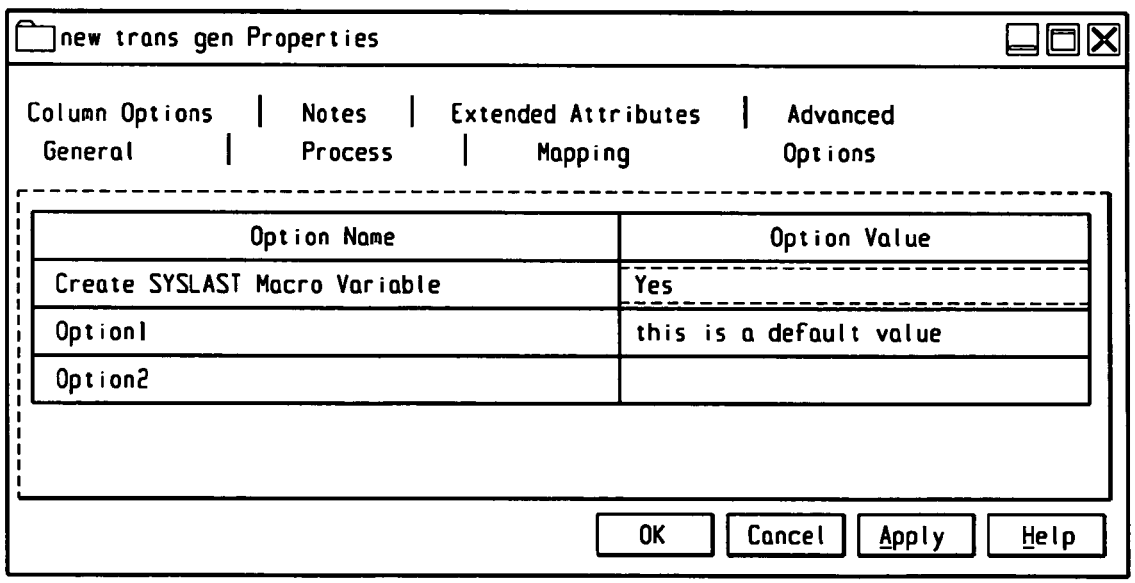
FIG. 16 is an example graphical user interface that shows the options of the template transform as they would be displayed to the user of the transform.

FIG. 15 is an example graphical user interface that displays how a template transform would appear to a user when integrating the template into a user defined job process. The prompts on the outputs show the specific output prompts that the designer specified for this process. FIG. 16 is an example graphical user interface that shows the options of the template transform as they would be displayed to the user of the transform. Here, the option names are displayed in a table and any default values are filled in automatically by the transform code.

Figure 17:
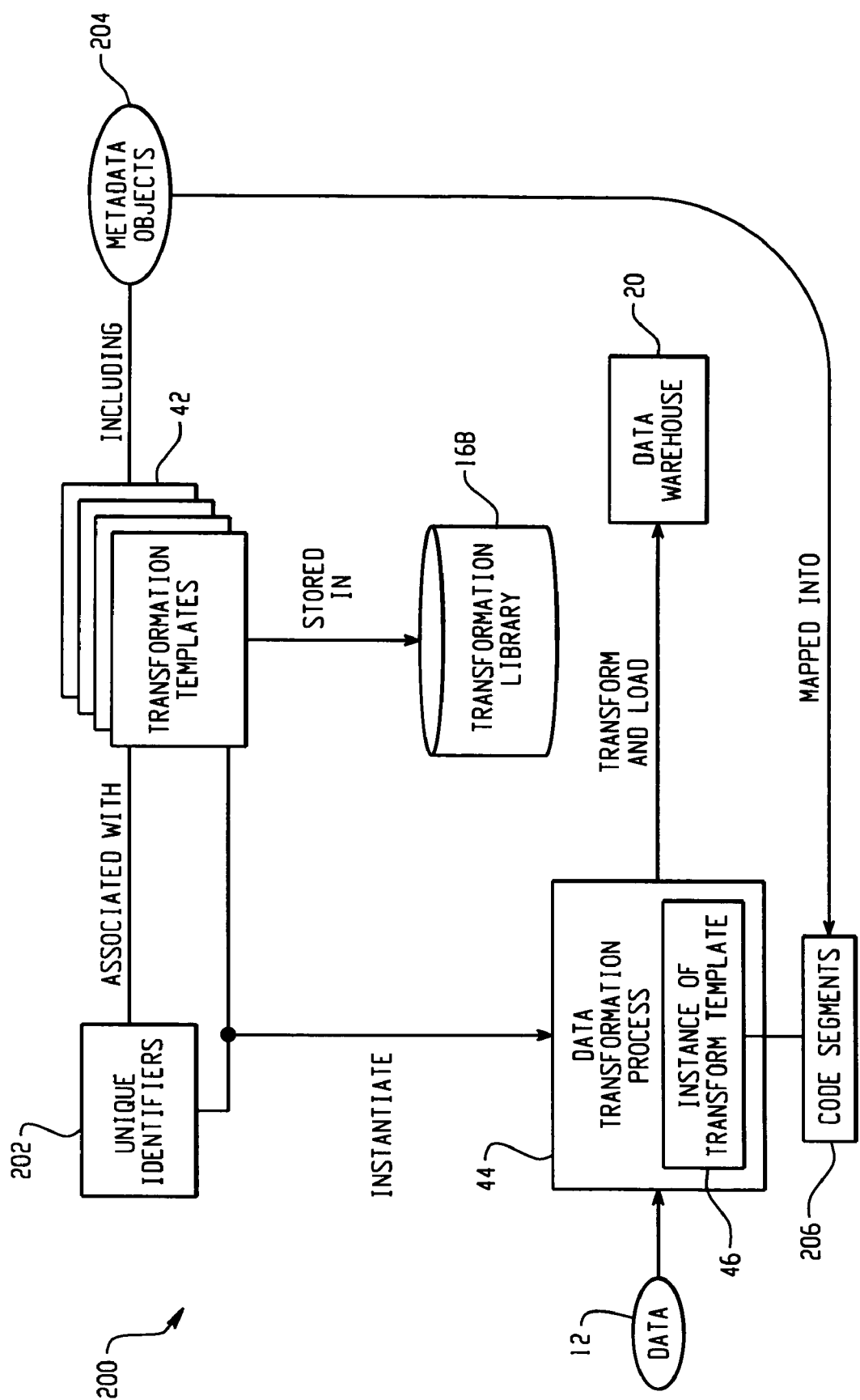
FIG. 17 is an example relationship diagram depicting a system and method of data warehousing.

FIG. 17 is an example relationship diagram 200 depicting a system and method of data warehousing. In this example system, a plurality of transformation templates 42 are stored in a transformation library 16B, each transformation template 42 including metadata objects 204 that describe how to transform extracted data 12 prior to loading the data into a data warehouse 20. A unique identifier 202 is associated with each of the plurality of transformation templates 42. Using this unique identifier 202, an instance 46 of at least one of the plurality of transformation templates 42 is instantiated into a data transformation process 44, wherein the metadata objects 204 of the transformation template 42 are mapped into the instance of the transform 46 using executable code segments 206. The data transformation process 44 is executed to transform and load the extracted data 12 into the data warehouse 20.

While certain examples have been used to disclose and illustrate one or more embodiments of the invention, including the best mode, and also to enable any person skilled in the art to make and use the invention, the patentable scope of the invention is defined by the claims, and may include other examples that occur to those skilled in the art.

It is further noted that the systems and methods disclosed herein may be implemented on various types of computer architectures, such as for example on a single general purpose computer or workstation, or on a network (e.g., local area network, wide area network, or internet), or in a client-server configuration, or in an application service provider configuration. Also, the system's and method's data (such as hierarchical dimensional data) may be stored as one or more data structures in computer memory and/or storage depending upon the application at hand. The systems and methods may be provided on many different types of computer readable media including instructions being executable by a computer to perform the system and method operations described herein. The systems and methods may also have their information transmitted via data signals embodied on carrier signals (e.g., radio frequency carrier signals) or other communication pathways (e.g., fiber optics, infrared, etc.).

The computer components, software modules, functions and data structures described herein may be connected directly or indirectly to each other in order to allow the flow of data needed for their operations. It is also noted that a module includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The computer components may be located on a single computer or distributed across multiple computers depending upon the situation at hand.

I claim:

1. A data warehousing method, comprising:
    executing software instructions on a computer system to store a plurality of transformation templates in a plurality of transformation libraries, each transformation template including metadata objects that describe how to transform extracted source data prior to loading the source data into a data warehouse within a data warehousing system;
    executing software instructions on the computer system to create a unique link that corresponds to a particular transformation template, wherein the link is unique to a particular data warehousing system housing one or more transformation libraries within one or more data warehouses;
    executing software instructions on the computer system to associate the unique link with the particular transformation template, such that the particular transformation template is identified by the unique link in each transformation library in the plurality of transformation libraries within a particular data warehouse;
    executing software instructions on the computer system to instantiate an instance of the particular transformation template into a data transformation process using the unique link associated with the particular transformation template, wherein the metadata objects of the particular transformation template are mapped into an instance of a transform using executable code segments; and
    executing software instructions on the computer system to execute the data transformation process to transform and load the extracted source data into the particular data warehouse using the particular transformation template.

2. The data warehousing method of claim 1, further comprising:
    executing software instructions on the computer system to export the executable code segments to a file.

3. The data warehousing method of claim 1, wherein the metadata objects of the particular transformation template include a main object that describes the name and purpose of the transform, a code object that supplies the generated code for the transform, and an input/output object that describes the inputs and outputs of the transform.

4. The data warehousing method of claim 3, further comprising:
    a version object that tracks modifications to the particular transformation template.

5. The data warehousing method of claim 3, further comprising:
    an options object that describes an interface to a user of the transform, the interface including one or more variable fields that are supplied by the user when customizing the instantiated transform.

6. The data warehousing method of claim 3, wherein the unique link associated with each transformation template is stored along with the template as a metadata object.

7. The data warehousing method of claim 1, wherein the executable code segments comprise XML code segments.

8. The data warehousing method of claim 1, further comprising:
    executing software instructions on the computer system to modify the particular transformation template stored in the transformation library;
    executing software instructions on the computer system to use a graphical user interface to perform a visual impact analysis on the modified particular transformation template corresponding to the unique link; and
    executing software instructions on the computer system to determine, based upon the visual impact analysis, whether any data transformation processes will be affected by the modifications.

9. The data warehousing method of claim 8, further comprising:
    executing software instructions on the computer system to accept the modifications to the particular transformation template and to save the modified template in the transformation library.

10. The data warehousing method of claim 9, further comprising:
    executing software instructions on the computer system to propagate the modified template to any data transformation process linked to the modified template via the unique link; and
    executing software instructions on the computer system to automatically update the data transformation process using the modified template.

11. The data warehousing method of claim 9, further comprising:
    executing software instructions on the computer system to propagate the modified template to any data transformation process that is linked to the template via the unique link; and
    executing software instructions on the computer system to prompt a user of the data transformation process to accept or reject the modified template.

12. The data warehousing method of claim 11, further comprising:
    if the user accepts the modified template, then executing software instructions on the computer system to update the data transformation process using the modified template; and
    if the user rejects the modified template, then executing software instructions on the computer system to discard the modified template.

13. The data warehousing method of claim 4, further comprising:
    executing software instructions on the computer system to compare the version object of the particular transformation template with an associated version object of the instance of the transformation in the data transformation process; and
    automatically executing software instructions on the computer system to update the instance of the transformation in the data transformation process with a current version of the particular transformation template if the version object of the particular transformation template indicates a newer version than the version object of the instance.

14. A data warehousing system, comprising
a processor;
a computer-readable storage medium containing instructions operable to cause the processor to perform operations including:
storing a plurality of transformation templates in a plurality of transformation libraries, each transformation template including metadata objects that describe how to transform extracted source data prior to loading the source data into a data warehouse within a data warehousing system;
creating a unique link that corresponds to a particular transformation template, wherein the link is unique to a particular data warehousing system housing one or more transformation libraries within one or more data warehouses;
associating a unique link with the particular transformation template, such that the particular transformation template is identified by the unique link in each transformation library in the plurality of transformation libraries within a particular data warehouse;
instantiating an instance of the particular transformation template into a data transformation process using the unique link associated with the particular transformation template, wherein the metadata objects of the particular transformation template are mapped into an instance of a transform using executable code segments; and
executing the data transformation process to transform and load the extracted source data into the particular data warehouse using the particular transformation template.

15. A computer-readable storage medium encoded with instructions that when executed, cause a computer to perform a data warehousing method, comprising:
storing a plurality of transformation templates in a plurality of transformation libraries, each transformation template including metadata objects that describe how to transform extracted source data prior to loading the source data into a data warehouse within a data warehousing system;
creating a unique link that corresponds to a particular transformation template, wherein the link is unique to a particular data warehousing system housing one or more transformation libraries within one or more data warehouses;
associating a unique link with the particular transformation template, such that the particular transformation template is identified by the unique link in each transformation library in the plurality of transformation libraries within a particular data warehouse;
instantiating an instance of the particular transformation template into a data transformation process using the unique link associated with the particular transformation template, wherein the metadata objects of the particular transformation template are mapped into an instance of a transform using executable code segments; and
executing the data transformation process to transform and load the extracted source data into the particular data warehouse using the particular transformation template.

* * * * *